(12) United States Patent
Bierganns et al.

(10) Patent No.: US 10,647,823 B2
(45) Date of Patent: May 12, 2020

(54) ADIABATIC GEL POLYMERIZATION PROCESS FOR THE PRODUCTION OF WATER-SOLUBLE POLYELECTROLYTES

(71) Applicant: SOLENIS TECHNOLOGIES, L.P., Wilmington, DE (US)

(72) Inventors: Patric Bierganns, Krefeld (DE); Markus Bröcher, Krefeld (DE); Christian Dollendorf, Krefeld (DE)

(73) Assignee: SOLENIS TECHNOLOGIES, L.P., Wilmington, DE (US)

( * ) Notice: Subject to any disclaimer, the term of this patent is extended or adjusted under 35 U.S.C. 154(b) by 55 days.

(21) Appl. No.: 15/981,840

(22) Filed: May 16, 2018

(65) Prior Publication Data
US 2019/0352471 A1 Nov. 21, 2019

(51) Int. Cl.
| | | |
|---|---|---|
| *C08J 3/075* | (2006.01) | |
| *C08F 2/22* | (2006.01) | |
| *C08L 33/26* | (2006.01) | |
| *C08F 2/48* | (2006.01) | |

(52) U.S. Cl.
CPC .......... *C08J 3/075* (2013.01); *C08F 2/22* (2013.01); *C08F 2/48* (2013.01); *C08L 33/26* (2013.01); *C08J 2333/24* (2013.01); *C08L 2203/20* (2013.01)

(58) Field of Classification Search
CPC .......... C08J 3/075; C08J 2333/24; C08F 2/48; C08F 2/22; C08L 33/26; C08L 2203/20
See application file for complete search history.

(56) References Cited

U.S. PATENT DOCUMENTS

| | | | |
|---|---|---|---|
| 6,262,141 B1 * | 7/2001 | Cywar | C08F 6/006 522/152 |
| 7,375,173 B2 | 5/2008 | Steiner et al. | |
| 9,708,442 B1 | 7/2017 | Kwisnek et al. | |
| 2005/0242045 A1 | 11/2005 | Steiner et al. | |
| 2007/0191506 A1 * | 8/2007 | Lu | C08F 2/48 522/178 |

OTHER PUBLICATIONS

ISA USPTO, International Search Report issued in International Application No. PCT/US2019/032338, dated Jul. 24, 2019.
BASF Aktiengesellschaft, "Trilon C Types", BASF Aktiengesellschaft, Jan. 2007.
Colonial Chemical Solutions, Inc., "Material Safety Data Sheet—Versenex 80,", Colonial Chemical Solutions, Inc., Sep. 24, 2008.
Oh et al, "Evaluation of the Isothermal Curing Process of UV-Cured Resin in Terms of Elasticity Studied through Micro-Brillouin Light Scattering.", Journal of Information Display, vol. 17, No. 2, 5, May 2016, pp. 87-91.

* cited by examiner

*Primary Examiner* — Jessica M Roswell
(74) *Attorney, Agent, or Firm* — Lorenz & Kopf, LLP

(57) ABSTRACT

The current process relates to an adiabatic gel polymerization process for the production of water-soluble polyelectrolytes using UV LED modules or a combination of a UV tube light sources and UV LED modules wherein the resulting polymer has increased throughput, lower residual monomer content as well as lower insolubles compared with current photoinitiated polymerization processes.

20 Claims, No Drawings

ADIABATIC GEL POLYMERIZATION PROCESS FOR THE PRODUCTION OF WATER-SOLUBLE POLYELECTROLYTES

BACKGROUND

The present invention relates to the production of water-soluble polyelectrolytes. The polymers that are produced are cationic vinyl polymers, which can then be used as flocculating agents in wastewater treatment, in ore and coal processing and in paper manufacture. In particular, the current process relates to an adiabatic gel polymerization process for the production of water-soluble polyelectrolytes using UV LED modules or a combination of a UV tube light sources and UV LED modules wherein the resulting polymer has increased throughput, lower residual monomer content as well as lower insolubles compared with current photoinitiated polymerization processes.

Water-soluble polyelectrolytes are used in large quantities worldwide in water treatment facilities to improve flocculation and dewatering of resulting sewage sludges. Generally, a cationic polymer is added to the system to bind with contaminants and dissolved particles in the water, such as, polymers of acrylic acid or its derivatives, methacrylic acid esters and copolymers of these esters from acrylamide.

In traditional water-solution polymerization, water-soluble monomers, such as acrylic monomers, can be polymerized in dilute aqueous solutions so as to obtain polymers in the form of gels which may then be dried and comminuted. When this is done, the polymerization can be carried out in a continuous process on a conveyor belt to which a layer of reactants is applied or discontinuously and batch-wise. The polyelectrolytes are generally synthesized by mixing a combination of monomer based on ethylenic unsaturated monomers and initiating a radical polymerization.

However, it was soon found that photoinitiated polymerization could be carried out with concentrated monomer solution and a high reaction rate at a lower reaction temperature, which is beneficial to the production of polymer with high molecular weight. Therefore, it is important that new photoinitiators and photoinitiator systems be developed to improve upon the heretofore developed products and processes.

The photoinitiators used in industry generally absorb light in the ultra-violet spectral range from around 250 nanometers to 450 nanometers, although a wide variety of photoinitiators absorbing from 400 nm to 700 nm have also been used. The photoinitiators convert this light energy into chemical energy in the form of reactive intermediates, such as free radicals, initiating polymerization.

Light absorption by the photoinitiator requires that an emission line from the light source overlaps with an absorption band of the photoinitiator. Therefore, it is realized that the photoinitiator is dependent upon the particular polymerization being accomplished.

Various compounds have been used in the past for the initiation of polymerization processes of monomers, whether cationic, anionic, or non-ionogenic. For example, diaryliodonium and triarylsulfonium salts are the most common compounds used as photoinitiators for cationic monomers. From the application point of view the most important physicochemical photoinitiators are their spectroscopic properties (i.e., the range and magnitude of light absorption) and the photo-cleavage efficiency (i.e., the efficiency of generation of a strong protic acids that initiate the cationic polymerization processes). These particular photoinitiators absorb UV light in the wavelength range between 220 nm and 280 nm, which creates an important technological problem, in that that there are no efficient and simultaneously powerful enough UV light sources that will emit in that range. Currently used and known light sources, which emit light in the absorption spectrum of the commercial cationic photoinitiators, are low pressure mercury lamps, deuterium bulbs are low-power light sources. Also seen are xenon lamps, which are broadband UV-Vis-NIR light sources and emit only a fraction of supplied energy below 300 nm. Therefore, in the photochemical industry, medium pressure mercury lamps (MPM lamps) are most commonly used as the source of ultraviolet light. However, these sources of light emit a big part of the energy at a broad range of wavelengths about 365 nm, which is away from the adsorption maximum of most commercial photoinitiators, resulting in lower product yields.

Photoinitiators, such as benzoin and benzoin derivatives have been used in the continuous production of polymers or copolymers of water-soluble monomers.

Current polymerization of cationic polyelectrolytes includes, in particular, polymerization of terpolymers of (meth)acrylamide, monomers based on cationic (meth) acrylic acid esters and monomers based on (meth)acrylamides and/or hydrolysis stable cationic monomers. The electrolytes are produced by known methods such as, emulsion, solution, gel and suspension polymerization.

However, there continues to be a need for new photoinitiated systems be developed for improvement upon the heretofore polymerized products and processes. Particularly, there is still a need wherein the resulting polymer has increased throughput, lower residual monomer content as well as lower insolubles compared with current photoinitiated polymerization processes.

SUMMARY

The current invention relates to an adiabatic gel polymerization process for the production of water-soluble polyelectrolytes. More specifically the process includes providing a monomer solution comprising an aqueous acrylamide, an ethylenically unsaturated monomer, and a photoinitiator. The polymerization of the polyelectrolyte can be carried out as a batch or continuous process. To begin the reaction, a monomer solution is purged with oxygen and the pH and temperature adjusted to begin the polymerization process.

A photopolymerization reaction is initiated utilizing a UV light source having a medium wavelength and desired intensity. The reaction is continued until a desired temperature is reached at which point the intensity of the UV light source is increased until a second desired temperature is reached producing a gelatinous polymer product. The product is dried and the dried product comminuted to a desired particle size depending on the end use.

DETAILED DESCRIPTION

The present process relates to an adiabatic photopolymerization process, for the production of water-soluble polyelectrolytes. A monomer solution including an aqueous acrylamide, an ethylenically unsaturated monomer, and an photoinitiator, is prepared and purged of oxygen. The pH and temperature are adjusted to desired values and polymerization is initiated using a UV light source having a medium wavelength and desired intensity. The reaction, which can be either a batch or continuous process, is continued until a specific temperature is reached at which time the intensity of the UV light source is increased and the reaction allowed to continue until a gelatinous product is produced. The gelatinous product is then dried and comminuted to a desired particle size.

In one aspect of the process, after the monomer solution, including the aqueous acrylamide, ethylenically unsaturated monomer, and photoinitiator is purged and before initiating photopolymerization, the pH can be adjusted to from about 3 to about 7 and the temperature adjusted to below 25° C., can be below 10° C. and may be below minus (−5°) C.

In some aspects of the process, the reaction can be a co-initiator polymerization wherein a redox-initiator is used in combination with a photo-initiator or the initiator can be solely a photo-initiator.

In other aspects of the process, after the monomer solution is purged and the pH and temperature adjusted as described above, a UV light source having a medium wavelength of about 365 nanometer (nm) and an intensity of from about 0.1 milliwatt per centimeter squared (mW/cm$^2$) to about 2.5 mW/cm$^2$ and can be from about 0.2 mW/cm$^2$ to about 2.0 mW/cm$^2$ is used for initiating photopolymerization.

In other aspects of the process, after photopolymerization is initiated and the temperature of the photopolymerization reaction reaches about 40° C. to about 80° C. or can be about 50° C. to about 60° C., the intensity of the UV light source is increased to from about 5 mW/cm$^2$@365±10 nm to about 1500 mW/cm$^2$@365±10 nm, can be from about 10 mW/cm$^2$ 365±10 nm to about 50 mW/cm$^2$@365±10 nm, and may be from about 15 mW/cm$^2$ 365±10 nm to about 30 mW/cm$^2$@365±10 nm, until reaching a maximum reaction temperature of about 50° C., can be about 120° C., and may be about 150° C. This would depend on the content of polymerizable substance.

In some aspects of the process, the reaction can be carried out in a continuous process, such as that described in U.S. Pat. No. 4,857,610, incorporated herein in its entirety, or a batch process.

In some aspects of the process, the UV light source can be a tube type light source, an LED light source, or a combination of a tube light source and an LED light source, wherein the initiating UV light source is a tube light source followed by and LED light source, i.e. when the intensity of the light source is increased, an LED light source is used. Or, wherein an LED is the initiating UV light source followed by a tube type UV light source as long as the intensity of the initial UV light source can be increased once the desired temperature of the polymerization reaction is reached.

In some aspects of the process, on completion of polymerization, the polymerized product obtained is in the form of a gelatinous material having the consistency of a gelled substance or gummy bear. The gelatinous material is dried at a temperature of from about 70° C. to 150° C. and can be a temperature of from about 80° C. to 130° C. Drying can be achieved batch wise or continuously, such as on a belt dryer or in a fluidized-bed dryer, at the temperature ranges given above. After drying, the product is ground to the desired particle size fraction. The desired particles size fraction can be from about 100 micron to about 1,400 micron, can be from about 200 micron to about 1,200 micron and may be from about 500 micron to about 800 micron, dependent upon the application the polymerized product is used for.

In other aspects of the process, the gelatinous material is dried batch wise in a circulating air-drying oven at a temperature of from about 70° C. to about 150° C., and can be at a temperature of from about 80° C. to 130° C. Drying of the gelatinous product can also be achieved at these temperatures in a continuous process, such as on a belt dryer or in a fluidized-bed dryer. After drying, the product is ground to the desired particle size fraction of from about 100 micron to about 1,400 micron, can be from about 200 micron to about 1,200 micron and may be from about 500 micron to about 800 micron, dependent upon the application the polymerized product is used for.

In yet other aspect, the gelatinous material can be dried using a temperature profile of about 110° C. to about 120° C. for about 10 minutes, followed by a temperature of about 95° C. to about 105° C. for about 40 minutes followed by a temperature of about 85° C. to about 95° C. for about 30 minutes prior to comminuting the dried product to the desired particle size.

Surprisingly it was found that in the case of using a UV light source, such as an LED light source, that a narrower emission spectrum and higher intensity in the target wavelength area could be achieved compared with the standard UV tubes or bulbs. Therefore, it was possible to produce polymeric products with higher monomer concentrations in the monomer solution. This results in higher throughputs being achieved at given conditions while maintaining the same product characteristics and specifications. For Example, the monomer content of the final product can be increased from 43% to 48% resulting in at least a 10% higher production rate. In addition, it is possible to produce products with lower amounts of residual monomers, a limiting factor with regards to regulatory requirements, than currently possible.

In some aspects of the current process, changes from one UV source, i.e. tube to LED, was found to be beneficial. To achieve the desired performance in the mentioned application the wavelength distribution and intensity is monitored and controlled during both the initial polymerization step and after increasing the intensity of the UV light source. The increase from the initial intensity of the UV light source to the final intensity of the light source should be at least 10-fold higher in intensity than the initial UV light source intensity, can be at least about 30-fold higher in intensity than the initial UV light source and may be at least about 60-fold higher in intensity than the initial UV light source for the targeted wavelength. The wavelength area of interest is dependent on the used initiator system and monomer mixture. However, the wavelength should be in the range from about 365 nm to about 395 nm. The width of the wavelength area is in the range of about plus or minus 50 nm, can be about plus or minus about 25 nm and may be in the range of about plus or minus 10 nm. UVA emission intensity per wavelength.

EXAMPLES

Comparison of UV spectra of a standard UV source for polymerization (here Philips Cleo Performance 40 W in blue) versus the UV LED source for polymerization at comparable µW/cm$^2$ over the entire spectrum.

When polymerizing at increased monomer solids, corresponding to increased throughput per time, only the use of an UV LED light source or partial use of UV LED leads to final products within the desired target range for this particular product. It was also found that not only when UV LED was used alone produced an improved polymerization process, but also the use of a UV LED light source in combination with a UV bulb light source and variations with other UV light sources are possible and within the intention of the present invention as long as there is an increase in light intensity at the appropriate time or temperature.

Table 1 below, shows the efficacy of changing the light source and/or intensity at a certain point in the polymerization process. The products Specifications in the table below was a minimum viscosity of 800 milliPascal (mPas), a maximum insolubles of 30 milliliter (ml), and a maximum residual acrylamide of 99 parts-per-million (ppm). The results indicate that when the intensity of the light source is increased during the polymerization process according to the current invention, a product having the desired properties can be produced more effectively.

TABLE 1

Polymerizations at increased monomer solids with standard UV light source (i.e. Philips Cleo Performance 40 W in blue) versus a UV LED light source with various intensity patterns.

| Examples Polymerization Phase | Start | | | | Viscosity | Insolubles | Residual Monomer |
|---|---|---|---|---|---|---|---|
| Reaction Temperature | −10° C. to 20° C. | 20° C. to 60° C. | 60° C. to $T_{max}$ | $T_{max}$ to End | | | |
| Standard 1 | Low intensity | Low intensity | Low intensity | Low intensity | In Spec | High | High |
| Standard 2 | Low intensity | High intensity | High intensity | High intensity | In Spec | High | High |
| Standard 3 | Low intensity | High intensity | | | Low | High | High |
| UV LED 1 | Low intensity | *High intensity* | *High intensity* | *High intensity* | In Spec | In Spec | Low |
| UV LED 2 | *Low intensity* | *High intensity* | *High intensity* | *High intensity* | In Spec | In Spec | Low |
| UV LED 3 | Low intensity | *High intensity* | High intensity | High intensity | In Spec | In Spec | Low |
| UV LED 4 | Low intensity | *High intensity* | | | Low | In Spec | High |

Standard Type: Bulb UV Source
Bold & Italicized: LED UV Source

Batch Reactions

Example 1—High Cationic Acrylic Acid Derivate Polyelectrolyte

The following chemicals were added to a standard polymerization vessel in the order 0.15 grams (g) of Trilon®C (10% solution, diethylenetriaminepentaacetic acid), 348.8 g of 43% aqueous acrylamide solution 437.5 g of 80% (2-Acryloyloxy-ethyl)-trimethylammonium chloride (ADAME-Quat) solution and 160.6 g of water. The pH of the mixture was adjusted to 5.0 with 50% sulfuric acid, and the mixture was cooled to minus −5° C. and oxygen was removed by purging the polymerization vessel with nitrogen.

After purging the polymerization vessel 0.50 g 2,2'-azobis(2-methylpropionamidine) dihydrochloride (ABAH) and polymerization was initiated using a UV tube light source (Philips Cleo Performance 40 W@approx. 350 μW/cm²). When the reaction temperature reached 60° C. the UV intensity was increased to 1500 μW/cm².

Within several minutes, the polymerization temperature rose from minus −5° C. to approximately 80° C. The resulting polymer was in the form of a gel, which was dried following the temperature profile: 115° C. for 10 minutes, then 100° C. for 40 minutes followed by 90° C. for 30 minutes. Using a meat grinder, the dried product was ground to a particle-size fraction of approximately 100 micron (μm) to 1400 μm as measured using sieve analysis.

Example 2—High Cationic Acrylic Acid Derivate Polyelectrolyte

The polymerization process described in Example 1 was followed except after polymerization was initiated using a UV tube light source (Philips Cleo Performance 40 W@approx. 350 μW/cm²) and the reaction temperature reached 60° C. the UV light source was changed to a UV LED module (with 365 nm LEDs with 3.5 W) at full power. Polymerization was continued until a temperature of 80° C. was reached. The product was dried according to the temperature profile used in Example 1 above, and ground to a particle-size fraction of approximately 100 μm to 1400 μm using sieve analysis.

Example 3—Medium Cationic Acrylic Acid Derivate Polyelectrolyte Ratio of Acrylamide To a standard polymerization vessel was added the following: 5 gram (g) of Trilon®C (10% solution of diethylenetriaminepentaacetic acid), 1269.8 g of 43% aqueous acrylamide solution, 367.5 g of an 80% ADAME-Quat solution and 345.7 g of softened water. The resulting monomer solution had a monomer content of 42%. The pH was adjusted to 5.0 with 50% sulfuric acid, and the mixture was cooled to minus −5° C. and oxygen was removed by purging with nitrogen. To this mixture was added 0.50 g of 2,2'-azobis(2-methylpropionamidine) dihydrochloride (ABAH), and polymerization was initiated using a UV tube light source (Philips Cleo Performance 40 W@approx. 1500 μW/cm²). Polymerization was continued until a temperature of 80° C. was reached resulting in a polymer gel, which was dried using the following temperature profile: 115° C. for 10 minutes, then 100° C. for 40 minutes followed by 90° C. for 30 minutes. Using a meat grinder, the dried product was ground to a particle-size fraction of approximately 100 μm to 1400 μm using sieve analysis.

Example 4—Medium Cationic Acrylic Acid Derivate Polyelectrolyte

The polymerization process described in Example 3 was followed, except after polymerization was initiated using a Philips Cleo Performance 40 W@approx. 1500 μW/cm² UV tube light source and the reaction temperature reached 60° C., the UV tube light source was changed to a UV LED module having a wavelength of 365 nm and an emission of 3.5 W at full power. Polymerization was continued until a temperature of 80° C. was reached. The product was dried according to the temperature profile used in Examples 1 and 3 above, and ground to a particle-size fraction of approximately 100 μm to 1400 μm using sieve analysis.

TABLE 2

| Polymer | Example | Insoluble [ml] | Brine Visc. [mPa * s] | Residual Acrylamide [ppm] |
|---|---|---|---|---|
| 1 - High Cationic acrylic acid derivate polyelectrolyte | 1 | 40 | 950 | 740 |
| 2 - High Cationic acrylic acid derivate polyelectrolyte | 2 | 5 | 890 | 540 |
| High Cationic acrylic acid derivate polyelectrolyte | Spec | Max. 15 | Min. 700 | Max. 999 |
| 3 - Medium Cationic acrylic acid derivate polyelectrolyte | 3 | 53 | 1550 | 1180 |
| 4 - Medium Cationic acrylic acid derivate polyelectrolyte | 4 | 5 | 1580 | 365 |
| Medium Cationic acrylic acid derivate polyelectrolyte | Spec | Max. 15 | Min. 700 | Max. 699 |

As can be seen in Table 2, in the experiments wherein the intensity of the light source was changed and increased, Examples 2 and 4, the resulting product was in the desired parameters in all three measurables. As can be seen, neither product resulting from the method used in Example 1 and Example 3, resulted in a product having the requisite insolubles.

Continuous Belt Reaction

Example 5—High Cationic Acrylic Acid Derivate Polyelectrolyte

Acrylamide, Adame-Quat (AETAC) and softened water are mixed inline to yield a monomer solution with 43% monomer content. The pH was adjusted to 5.5. the monomer solution was purged with nitrogen and cooled to −5° C. The monomer solution was mixed with ABAH initiator and applied to a conveyor belt system at a metered speed of 3000 kg/h and the belt having a speed of travel of 10 cm/minute, for a total reaction time of 30 minutes.

Polymerization was initiated using a UV tube light source (Philips Cleo Performance 40 W@between 0.8 and 1.8 mW/cm²@365 nm) until reaching the end of the conveyor belt resulting in a polymer gel, which was then dried and processed. At the end of the conveyor belt the resulting polymer gel was chopped, cut, dried, milled and sieved. Over that time range, the average brine viscosity and insolubles level of the resulting material was 880 mPa*s and, resp., 6 ml. residual monomer content was 570 ppm, which are the desired standard in the industry.

Example 6—High Cationic Acrylic Acid Derivate Polyelectrolyte

The AETAC monomer solution as described in Example 5 was mixed with ABAH and the mixture applied to a conveyor belt system at a metered speed of 3000 kg/h and polymerization was initiated using a UV tube light source (Philips Cleo Performance 40 W@between 0.8 and 1.8 mW/cm²@365 nm). The temperature of the reaction increased to 60° C. and was maintained for 5 minutes, at which time the intensity of the UV emission was increased to about 16-18 mW/cm²@365 nm, until reaching the end of the conveyor belt system. During this time the monomer content of the monomer solution increased to about 47%.

However, by increasing the intensity of the UV light source at a certain point, dependent upon such things as layer thickness, belt speed, initiating rate, etc. Depending on the type of belt process being used, adjustments will be necessary for each polymerization. In this Example, the average brine viscosity did not decrease and insolubles level of the resulting material did not increase with the average values 800 mPa*s brine viscosity, 5 ml insolubles. In fact, the residual monomer content was reduced being 160 ppm, on average.

Example 7—High Cationic Acrylic Acid Derivate Polyelectrolyte

The AETAC monomer solution as described in Example 5 was mixed with ABAH and the mixture applied to a conveyor belt polymerization system at a metered speed of 3000 kg/h. and polymerization was initiated using a UV tube light source (Philips Cleo Performance 40 W @ between 0.8 and 1.8 mW/cm²@365 nm). The reaction temperature reached 60° C. and maintained for 5 minutes at which time the intensity of the UV emission was increase to about 16-18 mW/cm²@365 nm. In that time frame the monomer content of the monomer solution was increased up to 48% to 50%. During that period the monomer feed was increased stepwise from 3000 kg/h to 4000 kg/h. Despite this the average brine viscosity dropped slightly while the insolubles level and residual monomer level stayed in the target area:

Example 8—High Cationic Acrylic Acid Derivate Polyelectrolyte

The procedure described in Example 7, was used in this example, except that a UV emission of 1.8 mW/cm²@365 nm was used over the entire continuous process. This resulted in an increase in viscosity and the residual monomer level went up extremely yielding over 1000 ppm. This shows that an increase of the monomer solids in the monomer solution leads to out of spec material when the intensity increase at the target temperature/reaction rate is not performed.

While the present invention has been described with respect to particular embodiments thereof, it is apparent that numerous other forms and modifications of this invention will be obvious to those skilled in the art. The appended claims should be construed to cover all such obvious forms and modifications which are within the true spirit and scope of the present invention.

Each reference cited in the present application, including books, patents, published applications, journal articles and other publications, is incorporated herein by reference in its entirety.

What is claimed is:

1. An adiabatic gel polymerization process for the production of water-soluble polyelectrolytes comprising:
   providing a monomer solution comprising an aqueous acrylamide, an ethylenically unsaturated monomer, and a photoinitiator;
   purging the monomer solution to remove oxygen and adjusting the pH to about 3-7 and a temperature below 25° C.;
   initiating photopolymerization utilizing a UV light source having a wavelength of from about 365 nanometer (nm) to about 395 nm and an intensity of from about 0.1 mW/cm$^2$ to about 2.5 mW/cm$^2$ until the temperature reaches from about 40° C. to about 80° C.;
   increasing the intensity of the UV light source to from about 5 mW/cm$^2$@365±10 nm to about 50 mW/cm$^2$@365±10 nm until reaching the maximum reaction temperature of from about 60° C. to about 150° C.; producing a gelatinous polymer;
   drying the gelatinous polymer and comminuting the dried product to a desired particle size.

2. The process according to claim 1, wherein the gelatinous polymer is cut prior to drying.

3. The process according to claim 1, wherein the adiabatic gel polymerization process is a continuous process.

4. The process according to claim 1, wherein the monomer solution is purged at a temperature below 10 degrees Celsius.

5. The process according to claim 1, wherein the monomer solution is purged at a temperature below minus 5 degrees Celsius.

6. The process according to claim 1, wherein photopolymerization is initiated utilizing a UV light source having an intensity of from about 0.2 mW/cm$^2$ to about 2.0 mW/cm$^2$.

7. The process according to claim 1, wherein the intensity of the UV light source is increased when the reaction temperature reaches from about 50° C. to about 60° C.

8. The process according to claim 1, wherein the intensity of the UV light source is increased to from about 10 mW/cm$^2$@365±10 nm to about 50 mW/cm$^2$@365±10 nm.

9. The process according to claim 8, wherein the intensity of the UV light source is increased to from about 15 mW/cm$^2$@365±10 nm to about 30 mW/cm$^2$@365±10 nm.

10. The process according to claim 1, wherein the reaction is continued until a reaction temperature of from about 80° C. to 120° C.

11. The process according to claims 1, wherein the initial UV light source is a tube light source or an LED light source.

12. The process according to claims 1, wherein the UV light source is a combination of tube and LED light sources.

13. The process according to claim 1, wherein the gelatinous polymer gel is dried at a temperature of from about from about 70° C. to 150° C.

14. The process according to claim 1, wherein the gelatinous polymer gel is dried over a temperature profile of about 110° C. to about 120° C. for about 10 minutes, followed by a temperature of about 95° C. to about 105° C. for about 40 minutes followed by a temperature of about 85° C. to about 95° C. for about 30 minutes.

15. The process according to claim 1, wherein the product is ground to a particle-size fraction of from about 100 micron to about 1400 micron.

16. The process according to claim 15, wherein the particles size fraction is from about 200 micron to about 1,200 micron.

17. The process according to claim 16, wherein the particles size fraction is from about 500 micron to about 800 micron.

18. The process according to claim 1, wherein when the temperature of the reaction reaches from about 40° C. to about 80° C., the intensity of the initial UV light source is increased at least about 10-fold higher.

19. The process according to claim 18, wherein when the temperature of the reaction reaches from about 40° C. to about 80° C., the intensity of the initial UV light source is increased by at least about 30-fold.

20. The process according to claim 19, wherein when the temperature of the reaction reaches from about 40° C. to about 80° C., the intensity of the initial UV light source is increased at least about 60-fold higher.

* * * * *